United States Patent
Almori et al.

(10) Patent No.: US 9,174,512 B2
(45) Date of Patent: Nov. 3, 2015

(54) HEATING, VENTILATION AND/OR AIR CONDITIONING SYSTEM, IN PARTICULAR FOR AN ELECTRIC AUTOMOBILE VEHICLE

(75) Inventors: Armelle Almori, Maurepas (FR); Philippe Pierres, Elancourt (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 304 days.

(21) Appl. No.: 13/575,753

(22) PCT Filed: Jan. 27, 2011

(86) PCT No.: PCT/EP2011/051167
§ 371 (c)(1),
(2), (4) Date: Oct. 11, 2012

(87) PCT Pub. No.: WO2011/092258
PCT Pub. Date: Aug. 4, 2011

(65) Prior Publication Data
US 2013/0020064 A1 Jan. 24, 2013

(30) Foreign Application Priority Data
Jan. 29, 2010 (FR) ...................................... 10 00370

(51) Int. Cl.
*B60H 1/00* (2006.01)
(52) U.S. Cl.
CPC ........ *B60H 1/00385* (2013.01); *B60H 1/00542* (2013.01); *B60H 2001/003* (2013.01)
(58) Field of Classification Search
CPC .................................................. B60H 1/00842
USPC ............. 165/203, 42, 43; 62/244; 454/70, 75
See application file for complete search history.

(56) References Cited

U.S. PATENT DOCUMENTS

| 5,195,574 A | * | 3/1993 | Tanaka et al. .................. 165/203 |
| 5,490,572 A | | 2/1996 | Tajiri et al. |
| 7,434,612 B2 | | 10/2008 | Alberternst et al. |
| 2009/0071178 A1 | | 3/2009 | Major et al. |

FOREIGN PATENT DOCUMENTS

| CN | 101386285 A | 3/2009 |
| EP | 2075873 A1 | 7/2009 |
| FR | 2865435 A1 | 7/2005 |
| JP | 2007072974 | 3/2007 |
| JP | 2009073430 | 4/2009 |
| JP | 2009201250 | 9/2009 |

OTHER PUBLICATIONS

English language abstract for FR 2865435 extracted from the espacenet.com database on Sep. 21, 2012, 30 pages.
International Search Report for Application No. PCT/EP2011/051167 dated Feb. 16, 2011, 5 pages.
English language abstract for CN 101386285A extracted from espacenet.com database on Nov. 7, 2014, 2 pages, attached to reference.

* cited by examiner

*Primary Examiner* — Ljiljana Ciric
(74) *Attorney, Agent, or Firm* — Howard & Howard Attorneys PLLC

(57) ABSTRACT

A heating, ventilation and/or air conditioning system (10) for an automobile vehicle, including a heating, ventilation and/or air conditioning housing (100) capable of allowing the thermal treatment of an air conditioning airflow to be used to maintain a desired temperature within the cabin, the heating, ventilation and/or air conditioning housing (100) having a primary distributor (132*b*, 133*b*, 134*b*) for the air conditioning air within the vehicle cabin so as to define a limited number of distribution configurations. The heating, ventilation and/or air conditioning system (10) includes an additional module (200) having additional distributors (212*b*, 213*b*) for the air conditioning airflow out of the cabin.

15 Claims, 3 Drawing Sheets

Figure 1:
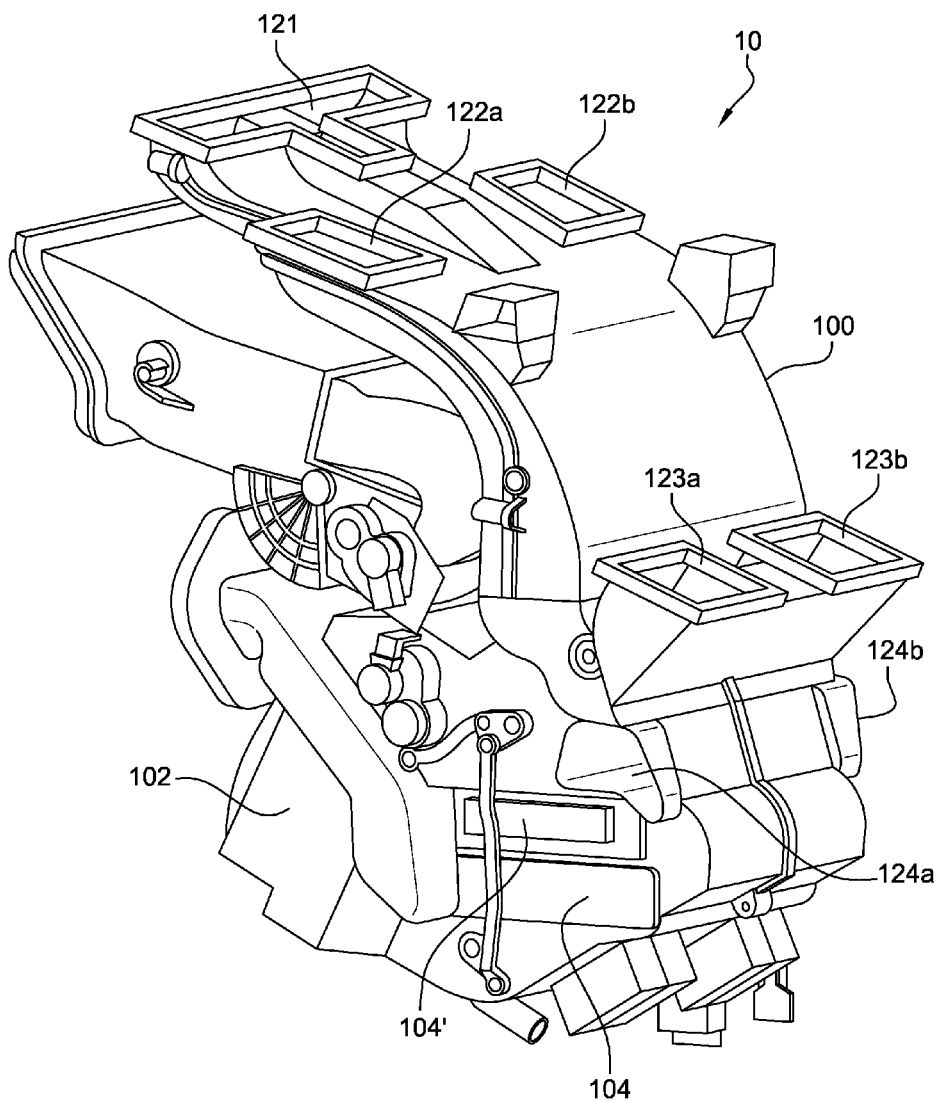

HEATING, VENTILATION AND/OR AIR CONDITIONING SYSTEM, IN PARTICULAR FOR AN ELECTRIC AUTOMOBILE VEHICLE

RELATED APPLICATIONS

This application is the National Stage of International Patent Application No. PCT/EP2011/051167, filed on Jan. 27, 2011, which claims priority to and all the advantages of French Patent Application No. FR 10/00370, filed on Jan. 29, 2010.

The present invention relates to a heating, ventilation and/or air conditioning system for distributing a flow of air, in particular for an electric automobile vehicle.

It is particularly advantageously applicable to the field of temperature regulation for batteries arranged in electric automobile vehicles.

In electric automobile vehicles, the power source propelling the vehicle is provided by a battery or a group of batteries. Given the high current intensities demanded, the battery or group of batteries is the site of significant thermal phenomena that must be controlled.

In particular, the temperature of the batteries must not exceed a maximum value beyond which they risk deterioration or even destruction. Furthermore, for each type of battery, there is an optimal operating temperature range within which the temperature of the batteries must preferably be. In fact, if the temperature is too low, the current delivered may be insufficient, whereas if it is too high, the batteries tend to lose charge and become worn.

It is therefore necessary to provide means in electric automobile vehicles making it possible to regulate the heat of the batteries, in particular to keep the temperature of the batteries within the optimal operating range.

Currently, the known means comprise a heat regulating system circulating a coolant. As an example, it is possible to consider circulating a flow of air generated by a fan, circulating water, in particular of the type used to ensure cooling of heat engines, or circulating a refrigerant fluid, for example like those used in air conditioning circuits, for example the refrigerant known under the name R134A, Freon, etc.

The regulating system is controlled by a battery management system that delivers a control signal to actuators of the heat regulating system each time it is necessary to regulate the temperature of the batteries, i.e. to cool or heat them, in particular to return the temperature of the batteries to the optimal operating range.

The known heat regulating systems are autonomous systems, dedicated solely to regulating the heat of the batteries. They are independent of any other heat circuit that may exist in the vehicles, in particular the airconditioning circuit.

As a result, to perform the heat regulating function, it is necessary to free a sufficient space to be able to install the heat regulating system dedicated to the batteries. This creates additional bulk in the storage area of the batteries, in particular when the batteries are stored under the hood, in addition to an increase related to the components that must be developed specifically for the heat regulating system itself.

Therefore, one aim of the invention is to propose a heating, ventilation and/or air conditioning system making it possible to perform a regulating heat exchange with the batteries, without a significant increase in the bulk and cost.

This aim is achieved, according to the invention, using a heating, ventilation and/or air conditioning system for an automobile vehicle, comprising a heating, ventilation and/or air conditioning housing capable of allowing the thermal treatment of an air conditioning airflow to be used to maintain a desired temperature within the cabin, the heating, ventilation and/or airconditioning housing comprising primary distribution means for the airconditioning air within the vehicle cabin so as to define a limited number of distribution configurations. More specifically, the heating, ventilation and/or airconditioning system comprises an additional module including additional means for distributing the air conditioning airflow outside the cabin.

Thus, it will be understood that the invention creates at least one additional outlet for the air conditioning airflow added to the existing outlets of the heating, ventilation and/or air conditioning system, dedicated solely to the air conditioning of the cabin, this additional outlet being intended to ensure a heat exchange between the air conditioning airflow in the components of the vehicle placed outside the cabin, in particular the batteries of an electric vehicle.

In this last application, the heat regulating system of the batteries is considerably simplified, since there is no need to provide particular means for implementing a specific coolant. In fact, the fluid used by the invention to regulate the temperature of the batteries is the air conditioning airflow also produced to maintain the comfort of the cabin. It is then sufficient simply to orient the outlet of the additional distribution means of the heating, ventilation and/or air conditioning system according to the invention toward the batteries.

This simplification results in a limited bulk of the heat regulating system and a lower cost.

According to one embodiment of the invention, the heating, ventilation and/or air conditioning system comprises control means capable of controlling the primary distribution means and the additional distribution means so as, simultaneously or consecutively, to close the distribution of the air conditioning airflow inside the cabin and open the distribution of the air conditioning airflow outside the cabin, and vice versa.

In this way, complete independence is obtained between the two distribution modes for the air conditioning airflow provided by the heating, ventilation and/or air conditioning system, according to the invention, consisting on the one hand of distributing the air conditioning airflow inside the cabin and, on the other hand, of distributing the air conditioning airflow outside the cabin, for example toward the batteries of the vehicle.

In particular, when the distribution of the air conditioning airflow outside the cabin is closed, the distribution of the air conditioning airflow inside the cabin may be done as usual, using the primary distribution means, over all vehicles, whether using electrical or thermal propulsion, without any modification related to the presence of the additional distribution means.

This observation makes it possible to consider a particularly advantageous embodiment in which the heating, ventilation and/or air conditioning system according to the invention is made up on the one hand of a primary housing comprising the primary means for distributing the air conditioning airflow inside the cabin and, on the other hand, an additional module attached on the primary housing, comprising the additional means for distributing the air conditioning airflow outside the cabin.

In this context, the heating, ventilation and/or air conditioning system that is the subject-matter of the invention assumes the form of a modular assembly of two distinct elements, i.e. on the one hand, a primary housing that is similar to the air conditioning air thermal treatment housing dedicated to the distribution of the air conditioning airflow inside the cabin, which is found permanently installed in the air-conditioned vehicles, and, on the other hand, an additional module, which can be optionally integrated into the primary housing in the case of electrical vehicles so as to regulate the temperature of the batteries. In this way, the primary housing is a basic element that can be used alone for heat-propelled vehicles and on which the additional module used for electrically-propelled vehicles can be added.

The heating, ventilation and/or air conditioning system according to the invention therefore makes it possible to install the additional module without substantially modifying the primary housing, in terms of the structure or functions thereof. In particular, when the additional module is not implemented to regulate the temperature of the batteries, the primary housing operates in the same way as in the absence of the additional module. Conversely, during periods where it is necessary to regulate the temperature of the batteries, all or part of the air conditioning airflow produced by the main housing of the heating, ventilation and/or air conditioning system is oriented toward the batteries using the additional module.

In one particular embodiment, the additional module comprises at least one additional air conditioning air outlet duct outside the cabin of the vehicle.

Advantageously, the heating, ventilation and/or air conditioning housing comprises at least one primary air conditioning air outlet section toward the cabin. In this configuration, the additional outlet duct communicates with the primary air conditioning air outlet section toward the cabin.

Furthermore, the primary distribution means can control the opening and/or closing of the primary outlet section. More particularly, according to one preferred embodiment, the primary air conditioning air outlet section toward the cabin of the vehicle is a central outlet section. In this particular arrangement, the additional outlet duct communicates with the central outlet section.

The present invention therefore advantageously consists of the fact that the heating, ventilation and/or air conditioning system comprises control means capable of arranging the primary distribution means in a given distribution configuration and the additional distribution means in an open position of the distribution of the air conditioning airflow outside the cabin.

Preferably, the heating, ventilation and/or air conditioning housing also comprises at least one foot outlet section. The given distribution configuration is then such that the primary distribution means can close the foot outlet section and open the central outlet section.

Furthermore, the heating, ventilation and/or air conditioning housing comprises at least one side outlet section. The given distribution configuration is such that the primary distribution means can open the side outlet section and the additional distribution means can close the side outlet section.

The present invention is particularly applicable to cooling of the batteries of electric automobile vehicles.

Figure 2:
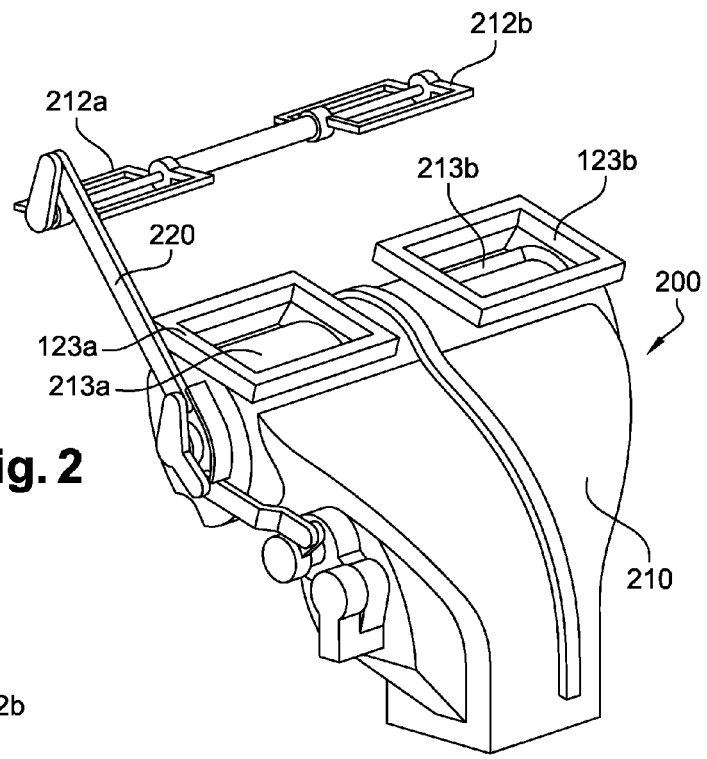
Figure 4:
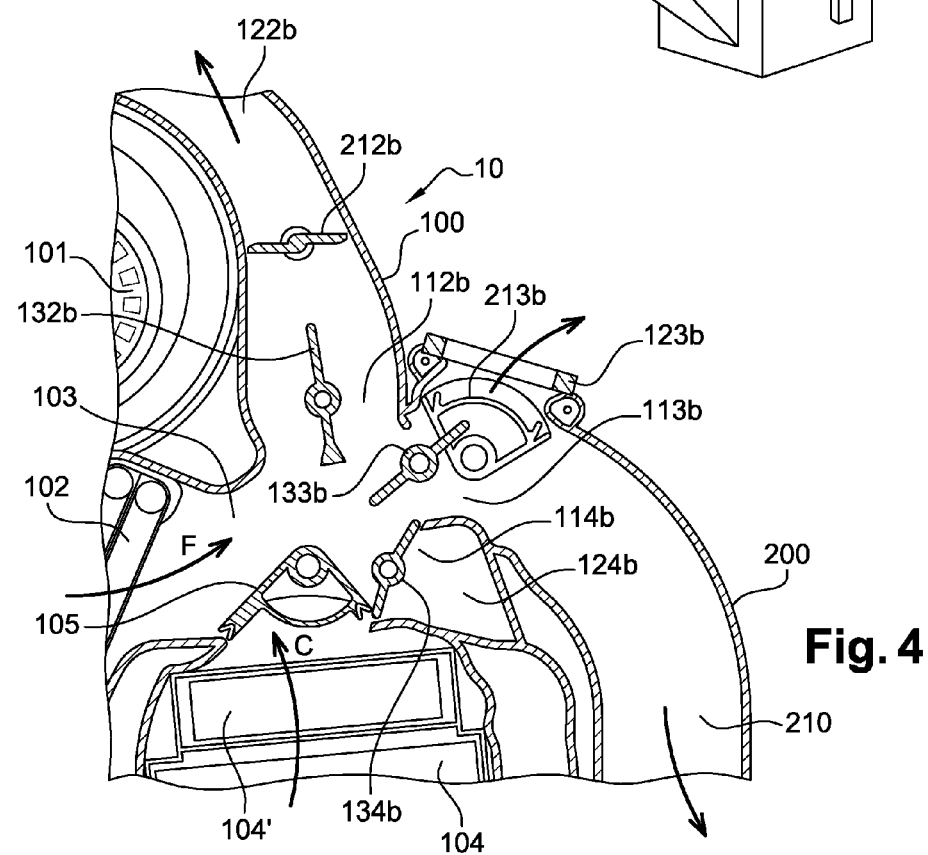
Figure 3:
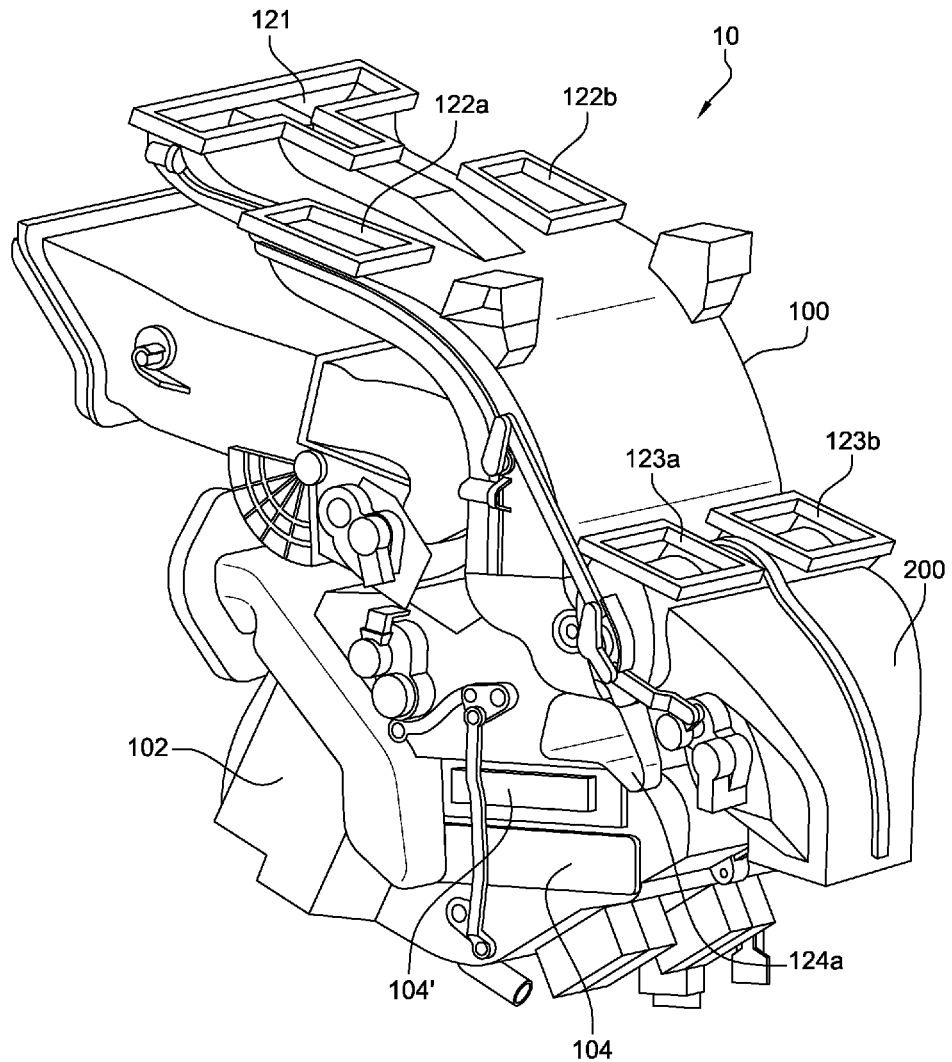

The present invention will be better understood, and other features and advantages thereof will appear, upon reading the following detailed description including non-limiting examples of embodiments, provided as an illustration in reference to the appended figures, which may serve to complete the understanding of the present invention, the description thereof, and, if applicable, may contribute to its definition, in which:

FIG. 1 is a perspective view of a housing of a heating, ventilation and/or air conditioning system according to the invention, FIG. 2 is a perspective view of an additional module of a heating, ventilation and/or air conditioning system according to the invention, FIG. 3 is a perspective view of a heating, ventilation and/or air conditioning system according to the invention made up of the additional module of FIG. 2 attached on the housing of FIG. 1, and FIG. 4 is a median cross-sectional view of the heating, ventilation and/or air conditioning system of FIG. 3.

FIG. 1 shows a heating, ventilation and/or air conditioning system 10 comprising a heating, ventilation and/or air conditioning housing 100. The heating, ventilation and/or air conditioning system 10 is of the type typically found in heating, ventilation and/or air conditioning facilities for the cabin of heat-propelled vehicles. In the rest of the description, the heating, ventilation and/or air conditioning housing 100 will also be identified as the primary housing 100.

The primary housing 100 includes traditional components capable of thermally treating a flow of air conditioning air intended to maintain a desired temperature inside the cabin. In particular, the primary housing 100 includes an air pulser 101, an evaporator 102, and at least one radiator 104. Furthermore, the primary housing 100 includes an air mixing chamber 103 making it possible to mix a hot airflow C and a cold airflow F so as to obtain an airflow at a desired temperature that can be distributed inside the cabin. The primary housing 100 can also include additional components such as a filter (not shown), an additional heating radiator 104', etc.

The components are visible in FIG. 4, which shows the air pulser 101 producing a flow of air, coming from outside the vehicle and or inside the cabin, channeled toward the operator 102, through which the airflow is cooled and dehumidified so as to produce the cold airflow F. A portion of the cold airflow F is oriented directly toward the air mixing chamber 103, while another portion of the cold airflow F is oriented toward the heating components such as the radiator 104, so as to produce the hot airflow C. The hot airflow C joins the cold airflow F in the air mixing chamber 103.

The temperature of the airflow mixed in the air mixing chamber 103 depends on the proportions of the cold airflow F and the hot airflow C respectively coming from the evaporator 102 and the radiator 104 entering the air mixing chamber 103. In order to allow the user to adjust the temperature of the air conditioning airflow to the desired value, in the primary housing 100, at least one mixing shutter 105 is provided, according to the example embodiment of the "drum" type, rotatably mobile so as to vary the proportion of the hot airflow C in the air mixing chamber 103 from 0% to 100% and, conversely, the proportion of the cold airflow F in the air mixing chamber 103 from 100% to 0%. In the example shown in FIG. 4, the mixing shutter 105 is in a so-called "all cold" position, in which the mixing chamber 105 is 100% supplied with of the cold airflow F and 0% of the hot airflow C. In the context of the present invention, the mixing shutter 105 is not limited to a shutter of the "drum" type, and may assume other forms.

Aside from the heat treatment components strictly speaking, the primary housing 100 comprises primary distribution means for the air conditioning air leaving the air mixing chamber 103 with the goal of distributing the airflow at the desired temperature inside the cabin, in various areas, according to the needs of the occupants of the vehicle.

According to the preferred embodiment shown in FIG. 1, the primary housing 100 comprises diffusers through which the air conditioning airflow can emerge outside the primary housing 100 to penetrate the cabin. The figure in particular shows:

a deicing diffuser 121, oriented toward the windshield of the vehicle, cabin diffusers, comprising side diffusers 122a and 122b and central diffusers 123a and 123b, respectively oriented toward the side and central areas of the cabin of the vehicle, and foot diffusers 124a and 124b oriented toward the lower areas of the cabin of the vehicle.

Advantageously, the side diffusers 122a and 122b, the central diffusers 123a and 123b, and the foot diffusers 124a and 124b are positioned symmetrically relative to the middle plane of the primary housing 100. Furthermore, it is also desirable for the deicing diffuser 121 to be arranged in a median position on the primary housing 100 and/or arranged symmetrically relative to the median plane of the primary housing 100.

According to the illustrated embodiment, the primary housing 100 includes two side diffusers 122a and 122b, two central diffusers 123a and 123b, and two foot diffusers 124a and 124b. However, the present invention also covers an arrangement including a different number of side diffusers, central diffusers and foot diffusers.

The distribution between the different diffusers of the air conditioning airflow downstream of the air mixing chamber 103 is done through the primary outlet sections communicating with the various diffusers.

FIG. 4 is a median cross-section of the heating, ventilation and/or air conditioning system of FIG. 3. It shows a side outlet section 112b communicating with the side diffuser 122b, a central outlet section 113b communicating with the central diffuser 123b, and a foot outlet section 114b communicating with the foot diffuser 124b.

Furthermore, the primary housing 100 according to the present invention is arranged symmetrically relative to a median plane. As a result, the primary housing 100 also comprises a side outlet section 112a communicating with the side diffuser 122a, a central outlet section 113a communicating with the central diffuser 123a, and a foot outlet section 114a communicating with the foot diffuser 124a, not shown in FIG. 4.

The primary housing 100 also comprises a primary deicing outlet section communicating with the deicing diffuser 121, not visible in FIG. 4.

The passage of the air conditioning airflow through the side outlet sections 112a and 112b, the central outlet sections 113a and 113b, and the foot outlet sections 114a and 114b is controlled by primary covering means. Preferably, but non-limitingly, the primary covering means are made up of butterfly valves.

FIG. 4 shows the primary distribution means for the air conditioning air made up of the primary covering shutters 132b, 133b and 134b making it possible to open or close the circulation of the air conditioning airflow respectively toward the side diffuser 122b, the central diffuser 123b and the foot diffuser 124b.

Likewise, by symmetry, the primary housing 100 includes primary distribution means for the air conditioning air made up of the primary covering shutters 132a, 133a and 134a making it possible to open or close the circulation of the air conditioning airflow respectively toward the side diffuser 122a, the central diffuser 123a and the foot diffuser 124a, not shown in FIG. 4.

The open or closed position of the primary covering shutters 132a, 133a and 134a is determined by kinematics connecting the primary covering shutters 132a, 133a and 134a to one another so as to define a limited number of standard distribution configurations among which the user can choose that which is best suited to maintain the desired comfort level inside the cabin.

In the description that will be provided, only the primary covering shutters visible in FIG. 4 will be mentioned, i.e. the primary covering shutters 132b, 133b and 134b. Of course, the primary covering shutters 132a, 133a and 134a also occupy various opening and closing positions. Thus, the side outlet sections 112a and 112b, the central outlet sections 113a and 113b, and the foot outlet sections 114a and 114b are respectively controlled by the pairs of primary covering shutters 132a-132b, 133a-133b and 134a-134b.

According to the arrangement of the various considered configurations of the heating, ventilation and/or air conditioning system 10, each primary shutter of a pair of primary shutters can be moved independently or in coordination with the other shutter of the same pair of primary shutters. In particular, the arrangements of the number of primary shutters can be related to the type of heating, ventilation and/or air conditioning system 10 desired, whether of the "single zone," "dual zone" or "multi-zone" type.

FIG. 4 shows an example of a configuration of the primary covering shutters called "cabin aeration" in which the primary covering shutters 132b and 133b, respectively controlling the side diffuser 122b, the central diffuser 123b are in the open position, allowing the air conditioning airflow to exit toward the cabin through the side outlet section 112b and the central outlet section 113b and the corresponding diffusers, the deicing diffuser 121 of the primary covering shutter 134b controlling the foot outlet section 114b communicating with the foot diffuser 124b in the closed position, the foot diffuser 124b not being supplied with air conditioning air.

In the case where the components of the vehicle located outside the cabin must be cooled or heated, such as batteries used to propel electric vehicles, the heating, ventilation and/or air conditioning system 10 according to the invention comprises the primary housing 100 on which an additional module 200 is attached including additional distribution means for the air conditioning airflow outside the cabin.

FIG. 2 is a perspective view of an additional module 200 of a heating, ventilation and/or air conditioning system 10 according to the present invention. Thus, FIG. 3 shows the heating, ventilation and/or air conditioning system 10 made up of the primary housing 100 as shown in FIG. 1, on which the additional module 200 is assembled as shown in FIG. 2.

As shown more specifically in FIG. 4, the additional module 200 comprises an additional outlet duct 210 for the air conditioning airflow outside the cabin. The additional outlet duct 210 communicates with the central outlet section 113b connected with the central diffuser 123b. Arranged in this way, the additional outlet duct 210 is supplied through the central outlet section 113b by the air conditioning airflow coming from the mixing chamber 103. According to alternative embodiments, the additional outlet duct 210 may be in communication with another outlet section of the primary housing 100.

In order to allow the air conditioning airflow to pass from the mixing chamber 103 toward the additional outlet duct 210, the primary covering shutter 133b, controlling the opening and closing of the central outlet section 113b, is in the open position.

Furthermore, the air conditioning airflow must not be diffused inside the cabin by the central diffuser 123b. Is thus necessary to provide an additional central covering means 213b. According to the example embodiment of FIG. 4, the additional central covering means 213b is made as a shutter of the "drum" type. The additional central coupling means 213b can assume two extreme positions consisting of:

on the one hand, a closed position of the additional duct 210 for typical operation of the primary housing 100, and on the other hand, a closed position of the central diffuser 123*b*, as shown in FIG. 4, for operation of the additional module 200 so as to regulate the temperature of the batteries.

In a complementary manner, the additional central covering means 213*b* can assume intermediate positions between the closed position of the additional duct 210 and the closed position of the central diffuser 123*b*.

Symmetrically, additional central covering means 213*a*, in particular a shutter of the "drum" type identical to that shown in FIG. 4, is positioned at the inlet of the central diffuser 123*a*, as shown by FIGS. 2 and 3.

The open and closed positions of the primary covering shutters are defined by a kinematic law making it possible to define a defined number of standard distribution configurations. In light of the possible arrangements of the primary covering shutters, it may be necessary to connect the primary covering shutters 133*a* and 133*b* with the foot diffusers 124*a* and 124*b* in the open position. Furthermore, it may also be necessary to bring other primary shutters into the open position, such as the primary opening shutter 132*b* for circulation of the air conditioning airflow toward the side diffuser 122*b* through the side outlet section 112*b*. This situation results from a limited number of distribution configurations. In the illustrated example, the opening of the primary opening shutters 133*a* and 133*b* toward the central diffusers 123*a* and 123*b* may only be done in the context of the so-called "cabin aeration" configuration, in which the primary covering shutters 132*a* and 132*b* toward the side diffusers 122*a* and 122*b* are also open.

In order to avoid an air leak through the side diffusers 122*a* and 122*b*, an additional side covering means 212*b* is provided for circulation of the air conditioning airflow toward the side diffuser 122*b* that may be brought into the closed position when the primary covering shutter 132*b* is in the open position. FIG. 2 shows such an additional side covering means 212*b* connected with the additional module 200, as well as the additional side covering means 212*a* arranged symmetrically.

The additional module 200 is integrated into the primary housing 100 for example by disassembling the central diffusers 123*a* and 123*b* present on the primary housing 100, as shown in FIG. 1, then attaching, on the primary housing 100, the additional module 200 including central aerators 123*a* and 123*b*, identical to those initially present on the primary housing 100.

In this operation, the central diffusers 123*a* and 123*b* of the additional module 200 assume exactly the same position as those initially provided in the primary housing 100, and the additional side covering means 212*a* and 212*b* are placed in the side diffusers 122*a* and 122*b* upstream of the primary covering shutters 132*a* and 132*b*.

We will henceforth refer to FIG. 3, which shows a perspective view of the heating, ventilation and/or air conditioning system 10 according to the invention made up of the additional module 200 of FIG. 2 attached on the primary housing 100 of FIG. 1. The heating, ventilation and/or air conditioning system 10 of FIG. 3 operates as follows.

According to the present invention, a management unit for the batteries of the vehicle, not shown, is positioned so as to control the temperature regulation. When the battery management unit determines that the temperature of the batteries must be regulated, so as to cool or heat them, instructions are sent to a control device of the heating, ventilation and/or air conditioning system 10 indicating that a distribution of the air conditioning airflow by the additional module 200 is required and specifying a reference temperature for the air conditioning airflow coming from the additional module 200.

In response to the received instructions, the control device of the heating, ventilation and/or air conditioning system 10 then performs two actions. The first action consists of bringing the mixing shutter 105 into a position where the proportions of the hot airflow C and the cold airflow F sent to the mixing chamber 103 make it possible to obtain the reference temperature required by the battery management unit.

A second action relates to the distribution means strictly speaking. In the particular embodiment of the primary housing 100 shown, the control device of the heating, ventilation and/or air conditioning system 10 brings the primary covering shutters 132*b* and 133*b* dedicated to the side diffuser 122*b* and the central diffuser 123*b* of the primary housing 100 into a position corresponding to the "cabin aeration" configuration for primary distribution, while the additional side covering means 212*b* is brought into the closed position and the additional central covering means 213*b* is brought into its position covering the central diffuser 123*b*.

According to one particular embodiment, the simultaneity of movements of the additional side covering means 212*b* and the additional central covering means 213*b* is obtained using a mechanical coupling rod 220.

When the temperature of the battery system is brought to within the optimal operating range, the battery management unit sends instructions to stop the additional distribution of the air conditioning airflow by the additional module 200.

The control device of the heating, ventilation and/or air conditioning system 10 then arranges the additional side coupling means 212*b* in the open position and brings the additional central covering means 213*b* into the covering position of the additional duct 210 to return to the "cabin aeration" configuration of traditional operation of the primary housing 100.

It is also necessary to emphasize that, although the invention has been described in the context of the so-called "cabin aeration" configuration where the primary covering shutters of the side and central diffusers are coupled to the opening and closing, it would be possible to define other standard configurations. In particular, it is possible to provide a configuration where only the primary covering shutters 133*a* and 133*b* dedicated to the central diffusers 123*a* and 123*b* would be open. In that case, the additional side covering means 212*a* and 212*b* would not be necessary.

Of course, the present invention also covers embodiments in which the control device of the heating, ventilation and/or air conditioning system 10 brings, as second action, the primary covering shutters 132*b* and 133*b* dedicated to the side diffusers 122*a* and 122*b* of the primary housing 100 into a position corresponding to a particular configuration, other than the so-called "cabin aeration" configuration.

It therefore emerges from the present invention that the additional heat management function for the batteries is simplified. This function does not require an additional distribution mode. In fact, the additional module 200 is superimposed on the primary housing 100 of a heating, ventilation and/or air conditioning system 10. Furthermore, the distribution of an airflow in the additional module 200 is obtained by positioning the primary covering shutters arranged in the primary housing 100 in one of the distribution configurations of the airflow initially provided by the primary housing 100.

Subsequently, the particular management of the airflow in the additional module is ensured by additional covering means.

It will lastly be noted that various embodiments may be done according to the principles of the invention. It must, however, be understood that these operating examples are provided as an illustration of the subject-matter of the invention. Of course, the invention is not limited to these embodiments previously described and provided only as examples. It encompasses various modifications, alternative forms and other alternatives that one skilled in the art may consider in the context of the present invention, and in particular any combinations of the different embodiments previously described.

Furthermore, the different operating modes previously described may be considered separately or in combination so as to produce alternatives and various configurations of the heating, ventilation and/or air conditioning system as defined according to the present invention.

The invention claimed is:

1. A heating, ventilation and/or air conditioning system (10) for an automobile vehicle, the heating, ventilation and/or air conditioning system (10) comprising a heating, ventilation and/or air conditioning housing (100) capable of allowing the thermal treatment of an air conditioning airflow to be used to maintain a desired temperature within a cabin of the vehicle, the heating, ventilation and/or air conditioning housing (100) comprising primary distribution means (132*a*, 132*b*, 133*a*, 133*b*, 134*a*, 134*b*) for the air conditioning air within the cabin so as to define a limited number of distribution configurations,
wherein the heating, ventilation and/or air conditioning system (10) further comprises an additional module (200) and additional means (212*a*, 212*b*, 213*a*, 213*b*) for distributing the air conditioning airflow outside the cabin,
wherein some of the additional means (212*a*, 212*b*) are located inside the air conditioning housing (100) and are connected to the additional module (200) by a coupling rod (220), and some additional means (213*a*, 213*b*) are located inside the additional module (200).

2. The heating, ventilation and/or air conditioning system (10) according to claim 1, wherein the additional module (200) comprises at least one additional air conditioning air outlet duct (210) outside the cabin of the vehicle.

3. The heating, ventilation and/or air conditioning system (10) according to claim 2, wherein the heating, ventilation and/or air conditioning housing (100) further comprises at least one air conditioning air primary outlet section (112*a*, 112*b*, 113*a*, 113*b*, 114*a*, 114*b*) toward the cabin, wherein the additional outlet duct (210) communicates with the primary air conditioning air outlet section (112*a*, 112*b*, 113*a*, 113*b*, 114*a*, 114*b*) toward the cabin.

4. The heating, ventilation and/or air conditioning system (10) according to claim 3, wherein the additional distribution means (212*a*, 212*b*, 213*a*, 213*b*) can orient the air conditioning airflow leaving through the primary outlet section (112*a*, 112*b*, 113*a*, 113*b*, 114*a*, 114*b*) toward the additional duct (210) and/or toward at least one diffuser (122*a*, 122*b*, 123*a*, 123*b*, 124*a*, 124*b*) emerging in the cabin.

5. The heating, ventilation and/or air conditioning system (10) according to claim 4, wherein the primary distribution means (132*a*, 132*b*, 133*a*, 133*b*, 134*a*, 134*b*) can control the opening and/or closing of the primary outlet section (112*a*, 112*b*, 113*a*, 113*b*, 114*a*, 114*b*).

6. The heating, ventilation and/or air conditioning system (10) according to claim 5, wherein the primary air conditioning air outlet section toward the cabin is a central outlet section (113*a*, 113*b*) and wherein the additional outlet duct (210) communicates with the central outlet section (113*a*, 113*b*).

7. The heating, ventilation and/or air conditioning system (10) according to claim 4, wherein the primary air conditioning air outlet section toward the cabin is a central outlet section (113*a*, 113*b*) and wherein the additional outlet duct (210) communicates with the central outlet section (113*a*, 113*b*).

8. The heating, ventilation and/or air conditioning system (10) according to claim 7, further comprising a control means able to arrange the primary distribution means (132*a*, 132*b*, 133*a*, 133*b*, 134*a*, 134*b*) in a given distribution configuration and the additional distribution means (212*a*, 212*b*, 213*a*, 213*b*) in an open position of the distribution of the air conditioning airflow outside the cabin.

9. The heating, ventilation and/or air conditioning system (10) according to claim 3, wherein the primary distribution means (132*a*, 132*b*, 133*a*, 133*b*, 134*a*, 134*b*) can control the opening and/or closing of the primary outlet section (112*a*, 112*b*, 113*a*, 113*b*, 114*a*, 114*b*).

10. The heating, ventilation and/or air conditioning system (10) according to claim 9, wherein the primary air conditioning air outlet section toward the cabin is a central outlet section (113*a*, 113*b*) and wherein the additional outlet duct (210) communicates with the central outlet section (113*a*, 113*b*).

11. The heating, ventilation and/or air conditioning system (10) according to claim 3, wherein the primary air conditioning air outlet section toward the cabin is a central outlet section (113*a*, 113*b*) and wherein the additional outlet duct (210) communicates with the central outlet section (113*a*, 113*b*).

12. The heating, ventilation and/or air conditioning system (10) according to claim 11, further comprising a control means able to arrange the primary distribution means (132*a*, 132*b*, 133*a*, 133*b*, 134*a*, 134*b*) in a given distribution configuration and the additional distribution means (212*a*, 212*b*, 213*a*, 213*b*) in an open position of the distribution of the air conditioning airflow outside the cabin.

13. The heating, ventilation and/or air conditioning system (10) according to claim 12, wherein the heating, ventilation and/or air conditioning housing (100) further comprises at least one foot outlet section (114*a*, 114*b*), wherein the given distribution configuration is such that the primary distribution means can close the foot outlet section (114*a*, 114*b*) and open the central outlet section (113*a*, 113*b*).

14. The heating, ventilation and/or air conditioning system (10) according to claim 13, wherein the heating, ventilation and/or air conditioning housing (100) further comprises at least one side outlet section (112*a*, 112*b*), wherein the given distribution configuration is such that the primary distribution means (132*a*, 132*b*, 133*a*, 133*b*, 134*a*, 134*b*) can open the side outlet section (112*a*, 112*b*), and the additional distribution means (212*a*, 212*b*) can close the side outlet section (112*a*, 112*b*).

15. The heating, ventilation and/or air conditioning system (10) according to claim 1, further comprising control means able to control the primary distribution means (132*a*, 132*b*, 133*a*, 133*b*, 134*a*, 134*b*) and the additional distribution means (212*a*, 212*b*, 213*a*, 213*b*) so as, simultaneously or consecutively, to close the distribution of the air conditioning airflow inside the cabin and open the distribution of the air conditioning airflow outside the cabin, and vice versa.

* * * * *